United States Patent
Fujitaka et al.

(10) Patent No.: US 6,353,088 B1
(45) Date of Patent: Mar. 5, 2002

(54) METHOD FOR REMOVING VOLATILE MATTER FROM POLYMER SOLUTION COMPOSITION

(75) Inventors: Toshihisa Fujitaka; Koji Hirashima; Hideki Ono, all of Kitakyushu; Keiichi Hayashi, Kisarazu, all of (JP)

(73) Assignee: Nippon Steel Chemical Co., Ltd., Tokyo (JP)

( * ) Notice: Subject to any disclaimer, the term of this patent is extended or adjusted under 35 U.S.C. 154(b) by 0 days.

(21) Appl. No.: 09/646,574

(22) PCT Filed: Mar. 26, 1999

(86) PCT No.: PCT/JP99/01576
§ 371 Date: Sep. 19, 2000
§ 102(e) Date: Sep. 19, 2000

(87) PCT Pub. No.: WO99/50314
PCT Pub. Date: Oct. 7, 1999

(30) Foreign Application Priority Data

Mar. 27, 1998 (JP) .............................. 10-81934

(51) Int. Cl.[7] .................................................. C08F 6/00
(52) U.S. Cl. ....................... 528/501; 528/481; 528/483; 528/490; 528/503; 526/65; 526/71
(58) Field of Search ................................. 528/481, 483, 528/490, 501, 503; 526/65, 71

(56) References Cited

U.S. PATENT DOCUMENTS

| | | | |
|---|---|---|---|
| 3,668,161 A | | 6/1972 | Nauman et al. |
| 4,550,149 A | * | 10/1985 | Morris et al. ................. 526/68 |
| 4,699,976 A | | 10/1987 | Matsubara et al. |
| 4,808,262 A | * | 2/1989 | Aneja et al. ................ 159/47.1 |
| 4,934,433 A | * | 6/1990 | Aboul-Nasr ................ 159/43.1 |
| 4,952,672 A | * | 8/1990 | Moore et al. ................ 528/481 |
| 4,954,303 A | * | 9/1990 | Moore et al. ................ 264/101 |
| 4,994,217 A | * | 2/1991 | Banevicius et al. ........ 264/45.9 |
| 5,442,041 A | * | 8/1995 | Mallikarjun et al. ........ 528/483 |
| 5,691,445 A | * | 11/1997 | Krupinski et al. .......... 528/483 |
| 5,861,474 A | * | 1/1999 | Weller et al. ................ 528/501 |
| 5,874,525 A | * | 2/1999 | Krupinski et al. .......... 528/502 |
| 5,932,691 A | * | 8/1999 | Khanin et al. .............. 528/483 |

FOREIGN PATENT DOCUMENTS

| | | |
|---|---|---|
| JP | A51-134781 | 11/1976 |
| JP | A59-166506 | 9/1984 |
| JP | A6-345810 | 12/1994 |

* cited by examiner

*Primary Examiner*—Samuel A. Acquah
(74) *Attorney, Agent, or Firm*—Birch, Stewart, Kolasch & Birch, LLP

(57) ABSTRACT

This invention relates to a method for removing unreacted monomers and other volatile matters from a polymer solution composition produced from a mixture containing an aromatic vinyl monomer, utilizes two or more flash devolatilizing vessels, and effects the removal by adjusting the solid content of the polymer solution composition at the outlet of the devolitilizer before the last-stage devolitilizer to a level in excess of 97%, adding 0.5–4 parts by weight of a foaming agent to the total polymer solution composition, passing the polymer solution composition through the last-stage devolitilizer while maintaining the pressure of the polymer solution at 10 kg/cm$^2$ or more by means of a pressure controller and the temperature in the range 190–260° C., introducing the polymer solution composition to a vapor-liquid separation vessel maintained at a vacuum of 20 Torr or less, and allowing the composition to foam.

3 Claims, 1 Drawing Sheet

METHOD FOR REMOVING VOLATILE MATTER FROM POLYMER SOLUTION COMPOSITION

This application is the national phase under 35 U.S.C. § 371 of PCT International Application No. PCT/JP99/01576 which has an International filing date of Mar. 26, 1999, which designated the United States of America.

FIELD OF TECHNOLOGY

This invention relates to a method for removing volatile matters from polymer solution compositions and, more particularly, to a method for removing volatile matters such as monomers contained in aromatic vinyl polymers to an extremely low level.

BACKGROUND TECHNOLOGY

Polystyrene packaging containers have rapidly gained ground because of their handiness and versatility and found wide use as foamed polystyrene trays, containers for drinking water and the like. In recent years, however, there is a demand for as much reduction as possible of residual monomer and solvent in polystyrene. In general, volatile matters in styrenic resins manufactured by continuous mass polymerization or solution polymerization are removed by such procedures as flash devolitilization, extrusion devolitilization and membrane devolitilization.

Of the methods proposed so far for devolitilization, one is disclosed in Japan Tokyo Koho Sho 54-30428 (1979). The specification of this patent describes meticulous control of various operating conditions, for example, temperature and pressure at inlet, state and speed of feeding, residence time, heat exchange efficiency, temperature and pressure at outlet in the heating step and temperature and degree of pressure reduction during flash evaporation in the step for vapor-liquid separation under reduced pressure. According to this method, however, the operating conditions are difficult to set, which causes such problems as unstable operation and substantial difficulty of preventing the formation of low-molecular-weight substances and, likewise, the amount of volatile matters is not satisfactory.

A method disclosed in Japan Kokai Tokkyo Koho Sho 59-166506 (1984) effects the separation of volatile matters in three stages. This method comprises reducing the amount of volatile components in the polymer solution to 1% or less before introduction of the polymer solution to the third stage and adding a foaming agent under this condition. This method necessitates raising of the temperature of the resins to be transferred to the final devolitilizer and suffers not only from low operating efficiency but also from poor dispersion of polymer solution and foaming agent, thus lessening the effect of the added foaming agent and not reducing satisfactorily the amount of volatile matters.

Another method disclosed in Japan Tokkyo Koho Hei 6-827 (1994) is concerned with two-stage devolitilization consisting of devolatilizing vessels and heating devices connected directly to one another and describes meticulous control of the amounts of unreacted monomer and solvent, temperature for heating, degree of pressure reduction, residence time at the bottom of devolatilizing vessels and residence time extending from the first devolatilizing vessel to the second. However, even this method could not reduce the amount of volatile matters to a satisfactory level although it could prevent the formation of low-molecular-weight substances.

A method which employs a plate heat exchanger in the heating section in order to heat the resins at high efficiency is devised as a modification of flash devolitilization, but it cannot be said that the method sufficiently removes residual monomer and solvent. Further removal of residual monomer and solvent by this method is virtually difficult to realize as it would require a still greater pressure reduction, which would in turn require an enormous vacuum device.

Moreover, an example of removal of residual monomer and solvent to an extremely low level has been reported for a method utilizing an extruder, particularly a twin-screw extruder, as devolitilizer. This method, however, faces a number of problems such as high equipment and running costs, necessity for an enormous vacuum device, and operability, maintenance and inspection of equipment. Likewise, a membrane devolitilizer has an agitating device which requires high running cost and faces problems of operability, maintenance and inspection of equipment.

Under the circumstances mentioned above, an object of this invention is to provide a method for reducing the content of residual volatile matters in a relatively simple and economical manner in the devolitilization of aromatic vinyl resins.

The present inventors have conducted extensive studies in order to achieve the aforementioned object, found that the content of volatile matters such as residual monomer in the devolitilization of aromatic vinyl resins can be reduced to an extremely low level by multi-stage devolitilization while specifying the devolving conditions in the final stage, and completed this invention.

DISCLOSURE OF THE INVENTION

Accordingly, in a method for removing unreacted monomer and other volatile matters from a polymer solution composition obtained by continuous mass polymerization or continuous solution polymerization of an aromatic vinyl monomer alone or a mixture of an aromatic vinyl monomer and other monomers copolymerizable with said aromatic vinyl monomer in the presence or absence of rubbery polymers, this invention relates to a method for removing volatile matters from a polymer solution composition which comprises effecting the removal in multiple stages with the use of two or more flash devolatilizing vessels, adding 0.5–4 parts by weight of a foaming agent to the total polymer solution composition during its transfer from the outlet of the devolitilizer before the last-stage devolitilizer to the inlet of the last-stage devolitilizer while adjusting the solid content of the polymer solution composition to a level in excess of 97% at the outlet of the devolitilizer before the last-stage devolitilizer, passing the polymer solution composition through a step from the inlet of the last-stage devolitilizer to a pressure controller while maintaining the pressure of the polymer solution composition at 10 kg/cm$^2$ or more by means of the pressure controller provided either inside or at the inlet of the last-stage devolitilizer and the temperature in the range 190–260° C., introducing the polymer solution composition to a vapor-liquid separation vessel maintained at a vacuum of 20 Torr or less and allowing the composition to foam.

This invention will be described in detail below.

A polymer solution composition to which the method of this invention is applicable refers to a composition obtained by continuous mass or solution polymerization of an aromatic vinyl monomer alone or a mixture of an aromatic vinyl monomer and monomers copolymerizable with said aromatic vinyl monomer in the presence or absence of rubbery polymers. This polymer solution composition is obtained in the polymerization step in the manufacture of styrenic resins and contains volatile matters such as unreacted monomer and solvent added during the polymerization. Examples are polymer solutions obtained in the manufacture of styrenic resins by mass or solution polymerization, for example, polystyrene (GPPS), rubber-modified polystyrene (HIPS), styrene-acrylonitrile copolymers (SAN), acrylonitrile-butadiene-styrene copolymers (ABS), styrene-methyl methacrylate copolymers (MS) and methyl methacrylate-butadiene-styrene copolymers (MBS).

Aromatic vinyl monomers here include styrene, α-methylstyrene, m-methylstyrene, p-methylstyrene, o-chlorostyrene and p-chlorostyrene and they may be used singly or as a mixture of two kinds or more.

Monomers copolymerizable with said aromatic vinyl monomers include acrylonitrile, methacrylonitrile, methyl methacrylate, ethyl methacrylate, methyl acrylate and ethyl acrylate and they may be used singly or as a mixture of two kinds or more.

Rubbery polymers include polybutadiene, styrene-butadiene copolymers, polyisoprene and natural rubber and they may be used singly or as a mixture of two kinds of more.

In the continuous mass polymerization or continuous solution polymerization of this invention, the solution viscosity of polymer solution can be reduced, if necessary, by addition of inert hydrocarbon solvents, for example, aromatic hydrocarbons such as toluene, xylene and ethylbenzene, either singly or as a mixture of two or more kinds.

It is allowable to add a polymerization initiator or a chain transfer agent if necessary. It is preferable to use a radical initiator such as organic peroxide as polymerization initiator; for example, benzoyl peroxide, azobisisobutyronitrile and lauroyl peoxide, either singly or as a mixture of two kinds or more. Useful as chain transfer agent are mercaptans, α-methylstyrene dimer and monoterpenoid-based molecular weight modifiers (terpinolene).

As for polymerization reactors for the formation of polymer solution compositions of this invention, a known type of reactor such as tank and plug flow may be adopted. The polymer solution composition flowing out of the last-stage reactor contains styrenic polymers and normally 10–30% by weight of volatile matters such as unreacted monomer and solvent. When the content of volatile matters is 30% by weight or more here, low-molecular-weight polymers tend to form with ease in the devolitilization step. On the other hand, when the polymerization is continued until the content of volatile matters becomes 10% by weight or less, the polymer solution composition becomes difficult to handle in the devolitilization step.

The polymer solution composition containing volatile matters is introduced to a multi-stage devolitilizer connected to the polymerization step. In this case, any known devolitilizer is applicable here except to the last-stage devolitilizer, but one structured in such a manner as to heat the polymer solution in the heating step and thereafter effect devolitilization in a vapor-liquid separation vessel is preferable for its high devolitilization efficiency. The last-stage devolitilizer of such a structure as to heat the polymer solution in the heating step and thereafter effect devolatilization in a vapor-liquid separation vessel is most preferable for its high devolatilization efficiency. In the last-stage devolitilizer, the method of this invention maintains the pressure of the polymer solution in the step from the inlet of the last-stage devolitilizer to a pressure controller at 10 kg/cm² or more by means of the pressure controller provided either inside the last-stage devolitilizer or at the inlet of the last-stage devolitilizer thereby keeping the final product from mixing with foreign matters caused by burning, contamination and gel formation, improving the dispersion of the polymer solution and the added foaming agent and reducing the amount of residual monomer in the product.

It is necessary in this invention to install a devolitilizer arranged at least in two stages. A devolitilizer in three stages or more is not objectionable, but is not desirable because of increased equipment cost. Where a single-stage devolitilizer is installed, it is necessary to adjust the solid content of the polymer solution composition to a level in excess of 97% at the inlet of the devolitilizer, which is virtually difficult to do.

A pressure controller in the last stage is generally a valve, but another approach is to provide plural small holes at the inlet of a devolitilizer or in the heating unit of a devolitilizer containing a heating step. In particular, where a heat transfer tube is used in the heating step, it is preferable to provide an orifice in each heat transfer tube from the standpoint of simplicity. The procedure for providing orifices is not restricted in any way, but an orifice in such a form as to be inserted or screwed to the inside of the heat transfer tube is desirable for ease of attachment and replacement. The diameter of small holes and orifices to be provided in plural at the inlet of a devolitilizer can be determined by the pressure to be required. The site for installing a pressure controller in a devolitilizer containing a heating step is not specific and the pressure controller in question may be installed at the inlet, outlet or midpoint of the heating device as long as the polymer solution can be maintained at a pressure of 10 kg/cm² or more and the polymer solution and foaming agent can be dispersed uniformly. Installation of a pressure controller at the inlet of the heating device does not require for the entire heating device to be made pressure-resistant and is desirable from the standpoint of equipment cost. It is allowable to provide similarly a pressure controller in devolatilizers other than the last one to improve the dispersion of polymer solution.

Where a heating unit is required for each devolatizer, a heat exchanger to be used there is preferably of the type normally used for high-viscosity fluids, for example, a vertical multitubular heat exchanger or plate type heat exchanger. Although not restricted to any particular type, the vertical multitubular type is preferable to the plate type as it has a simple structure, can be constructed pressure-resistant and is low in cost.

Transfer of the polymer solution to a vapor-liquid separation vessel can be effected by a system such as the one where the heating device is directly connected to the separation vessel, the one where the heating device is arranged inside the separation vessel and the one where the polymer solution is transferred to the vessel by a transfer tube, but is not limited to any particular system. The number of heat transfer units and the size of heating area are suitably varied depending upon the kind of polymer solution, the concentration of volatile matters and the like. As an example, the introduction of the polymer solution to the first-stage devolatizer will be explained. The temperature at the inlet of the heating zone is approximately equal to that of the liquid in the last-stage reactor and the temperature of the liquid at the outlet of the first-stage devolatizer is normally 200–300° C.

The polymer solution composition withdrawn from the outlet of the devolatizer before the last-stage devolatizer needs to be adjusted so that the solid content exceeds 97%, preferably reaches 98% or more, more preferably reaches 99% or more. Where the solid content is less than 97%, not only the devolatizing efficiency becomes poor and the amount of volatile matters unsatisfactory but also low-molecular-weight substances form during transfer of resins to the last-stage devolatizer and during heating in the last-stage devolatizer with the resultant deterioration of product quality. Adjustment of the solid content of a polymer solution composition to a level in excess of 97% can be made by properly controlling the solid content of polymer solution composition entering the devolatizer before the last-stage devolatizer, the temperature of the heating tube in the heating device in said devolatizing step, the flow rate of reaction solution, and the degree of pressure reduction in the vapor-liquid separation vessel.

It is necessary to add 0.5–4 parts by weight, preferably 1–4 parts by weight, of a foaming agent to the total polymer solution composition to be transferred to the last-stage devolatizer. With addition of less than 0.5 part by weight of foaming agent, the effects for promoting foaming and reducing partial pressure are lessened and the amount of residual monomer becomes less than satisfactory. On the other hand, addition of more than 4 parts by weight produces no incremental effect and rather adversely causes such problems as insufficient dispersion of foams. A foaming agent useful for this invention is preferably water or alcohol which is immiscible with the polymers formed and shows roughly the same volatility as the volatile matters in the polymer solution composition. Water is most desirable because of ease of recovery and high foaming effect.

A foaming agent is added in any suitable manner in the step for transferring the polymer solution from the outlet of the devolatizer before the last-stage devolatizer to the inlet of the last-stage devolatizer. The means of addition is not restricted to any particular one, but what is conceivable here is to install a static mixer or an extruder in order to add a specified amount of foaming agent with good dispersion to the polymer solution to be transferred to the last-stage devolatizer. From the standpoint of equipment and running costs and maintenance and inspection, it is desirable to install a static mixer for the addition and dispersion of foaming agent.

According to the method of this invention, it is necessary to maintain the pressure of the polymer solution at 10 kg/cm$^2$ or more, preferably at 20 kg/cm$^2$ or more, more preferably at 30 kg/cm$^2$ or more, over the range from the inlet of the last-stage devolatizer to the pressure controller by means of the pressure controller provided inside the last-stage devolatizer. A pressure of less than 10 kg/cm$^2$ produces poor dispersion of polymer solution or foaming agent, thus damaging the effect of adding foaming agent and failing to reduce the amount of volatile matters to a satisfactory level. Although the pressure is not specified as to its maximum, it is preferably 150 kg/cm$^2$ or less in view of the manufacturing cost of equipment.

It is also necessary to keep the temperature of the polymer solution composition in the range 190–260° C., preferably 200–250° C., more preferably 220–240° C., over the range from the inlet of the last-stage devolatizer to the pressure controller. Where the temperature of the polymer solution is below 190° C., the equilibrium concentration does not fall sufficiently and the amount of volatile matters does not decrease. Where the temperature of the polymer solution is above 260° C., low-molecular-weight polymers tend to form easily even if the solid content has been adjusted to a level in excess of 97% in the preceding step and the product quality deteriorates.

In this invention, it is necessary to reduce the pressure below 20 Torr, preferably below 10 Torr, inside the vapor-liquid separation vessel in the last-stage devolatizer. At a reduced pressure above 20 Torr, the equilibrium concentration does not fall sufficiently and the amount of volatile matters does not decrease.

In case a heating device is provided in the last-stage devolatizer in this invention, heating is effected preferably at a temperature in the range 210–280° C., more preferably in the range 230–260° C. When heating is effected below 210° C., foaming of the polymer solution is not sufficiently promoted, the equilibrium concentration does not fall sufficiently and the amount of volatile components cannot be reduced. On the other hand, when heating is effected above 280° C., the decomposition of resins occurs and not only the amount of residual monomer becomes unsatisfactory but also low-molecular-weight substances tend to form, resulting in deterioration of product quality.

In this invention, resin modifiers and other additives may be added at any step in the manufacture of resins. The addition may be made, for example, by an extruder after completion of devolatilization. These resin modifiers include liquid mold release agents such as liquid paraffin, powder release agents such as low-molecular-weight polyethylene wax and zinc stearate, antioxidants, antistatic agents and plasticizers.

PREFERRED EMBODIMENTS OF THE INVENTION

The method for removing volatile matters from polymer solution composition in accordance with this invention will be explained concretely with reference to the attached drawings.

Figure 1:
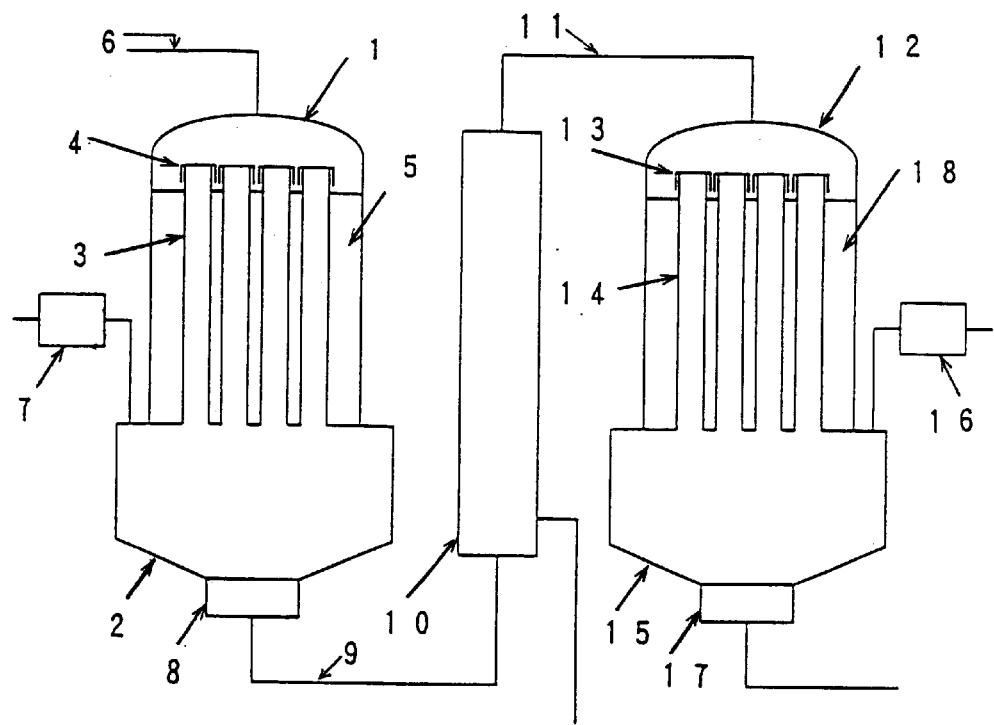
FIG. 1 is a schematic drawing of an example of two-stage devolatizer useful for practicing the method of removing volatile matters of this invention and FIG. 2 is an enlarged drawing of the part connecting an orifice provided inside the devolatizer of FIG. 1 for use as pressure controller and a tube of a multitubular heat exchanger.
Figure 2:
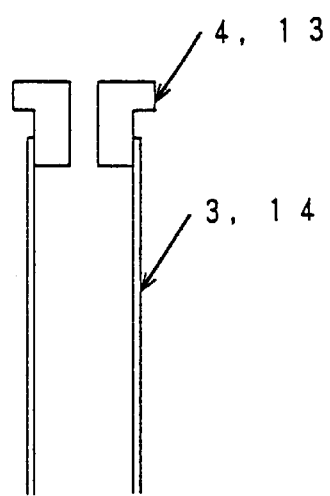

The two-stage devolatizer shown in FIG. 1 is composed of a first-stage devolatizer and a second-stage devolatizer and each devolatizer is composed of a vertical multitubular heat exchanger 1 or 12 serving as a heater for a polymer solution composition and a vapor-liquid separation vessel 2 or 15 respectively placed below and directly connected to the vertical multitubular heat exchanger.

The vertical multitubular heat exchanger 1 of the first-stage devolatizer is connected to an exit line 6 of the polymerization step, an orifice 4 is provided as a pressure controller at the inlet of a heat transfer tube 3 and the space outside the heat transfer tube 3 constitutes a heating zone 5. The vapor-liquid separation vessel 2 is connected to a volatile matter recovery device 7 which is connected to a vacuum pump, not shown in the figure, and also connected at its bottom to a polymer transfer device 8 for withdrawal of the devolatilized polymer.

A foaming agent needs to be added during the transfer of the polymer solution composition from the outlet of the first-stage devolatizer to the inlet of the second-stage devolatizer and it is driven into a static mixer 10 by means of a pump, not shown, and dispersed. The polymer solution composition flowing through the static mixer 10 is fed through a transfer line 11 to the vertical multitubular heat exchanger 12 of the second-stage devolatizer.

The second-stage devolatilzer may be constructed similarly to or differently from the first-stage devolatizer. When constructed similarly, the orifice to be provided as a pressure controller differs in the size of opening from devolatizer to devolatizer because of the difference in pressure requirement and, in general, orifices in the second-stage devolatizer becomes smaller. Also, the vapor-liquid separation vessel 15 is connected to a volatile matter recovery device 16 which is connected to a vacuum pump, not shown in the figure, and also connected at its bottom to a polymer transfer device 17 for withdrawal of the devolatilized polymer.

In the first-stage devolatizer, a heat transfer medium is circulated in the heating zone 5 of the heat exchanger 1 to keep the temperature of the heat transfer tube 3 at a constant level. The polymer solution introduced from the exist line 6 of the polymerization step to the heat exchanger 1 first passes through the orifice 4 and is heated to a specified temperature during the passage through the heat transfer tube 3 while foaming. The polymer solution composition from the inlet of the devolatizer in the end plate to the pressure-controlling orifice 4 is in the state of uniform dispersion by pressure drop in the orifice 4.

The polymer solution heated to the specified temperature is introduced in a jet from the outlet of the heat transfer tube 3 to the vapor-liquid separation vessel 2 whose pressure has been reduced to a specified level. Volatile matters in the polymer solution such as unreacted monomer and solvent evaporate there all at once and the so-called vapor-liquid separation by flashing is effected. The volatile matters thus separated are recovered in the volatile matter recovery device 7 provided above the vapor-liquid separation vessel 2 and the devolatilized polymer is withdrawn by the polymer transfer device 8 provided below the vapor-liquid separation vessel 2, then transferred through a transfer line 9 to the static mixer 10, mixed with a foaming agent and dispersed, and introduced through the transfer line 11 to the second-stage devolatizer 12.

In the second-stage devolatizer, the polymer solution composition passes through the orifice 13 and, during the passage through the heat transfer tube 14 located inside the heating zone 18, is heated to a specified temperature while foaming. The polymer solution composition from the inlet of the devolatizer in the end plate to the pressure-controlling orifice 13 is in the state of uniform dispersion by pressure drop in the orifice 13. The polymer solution heated to the specified temperature is introduced in a jet from the outlet of the heat transfer tube 14 to the vapor-liquid separation vessel 15 whose pressure has been reduced to a specified level. Volatile matters in the polymer solution such as unreacted monomer and solvent evaporate there all at once and the so-called vapor-liquid separation by flashing is effected. The volatile matters thus separated are recovered in the volatile matter recovery device 16 provided above the vapor-liquid separation vessel 15 and the devolatilized polymer is withdrawn by the polymer transfer device 17 provided below the vapor-liquid separation vessel 15 as polymer nearly completely free of volatile components.

This invention will be explained in more detail below with reference to concrete examples, but this invention is in no way limited to these examples. Resins are analyzed by the following methods in the examples.

(1) Determination of Volatile Matters

The sample is dissolved in dimethylformamide and submitted to gas chromatography.

(2) Determination of Low-molecular-weight Substances

The sample is dissolved in methyl ethyl ketone, a large amount of methanol is added to the solution to precipitate polymers and the amount of the precipitates is measured.

EXAMPLE 1

Using styrene as monomer, a mixture of 95% by weight of styrene and 5% by weight of ethylbenzene was submitted to continuous mass polymerization to give a polymer solution composition containing 80% by weight of solids. The composition was introduced continuously to the two-stage devolatizer shown in FIG. 1 and volatile matters mainly consisting of unreacted monomer were removed with the use of water as a foaming agent. Table 1 shows the operating conditions of the last-stage devolatizer and the analytical results of the pellets obtained.

EXAMPLE 2

Devolatilization was effected as in Example 1 except adjusting the solid content of the polymer solution to be introduced to the last-stage devolatizer to 98% by weight and adding 3% of the foaming agent. Table 1 shows the operating conditions of the last-stage devolatizer and the analytical results of the pellets obtained.

EXAMPLE 3

Devolatilization was effected as in Example 1 except setting the temperature of the polymer solution to be introduced to the last-stage devolatizer at 215° C. and adding 3% of the foaming agent. Table 1 shows the operating conditions of the last-stage devolatizer and the analytical results of the pellets obtained.

EXAMPLE 4

Devolatilization was effected as in Example 1 except heating the heat transfer tubes in the last-stage devolatizer at 270° C. and adding 3% of the foaming agent. Table 1 shows the operating conditions of the last-stage devolatizer and the analytical results of the pellets obtained.

COMPARATIVE EXAMPLE 1

Devolatilization was effected as in Example 1 except adjusting the solid content of the polymer solution to be introduced to the last-stage devolatizer to 95% by weight. Table 2 shows the operating conditions of the last-stage devolatizer and the analytical results of the pellets obtained.

COMPARATIVE EXAMPLE 2

Devolatilization was effected as in Example 1 except setting the temperature of the polymer solution to be introduced to the last-stage devolatizer at 180° C. Table 2 shows the operating conditions of the last-stage devolatizer and the analytical results of the pellets obtained.

COMPARATIVE EXAMPLE 3

Devolatilization was effected as in Example 1 except setting the temperature of the polymer solution to be introduced to the last-stage devolatizer at 270° C. Table 2 shows the operating conditions of the last-stage devolatizer and the analytical results of the pellets obtained.

COMPARATIVE EXAMPLE 4

Devolatilization was effected as in Example 1 except setting the vacuum of the last-stage devolatizer at 25 Torr. Table 2 shows the operating conditions of the last-stage devolatilzer and the analytical results of the pellets obtained.

COMPARATIVE EXAMPLE 5

Devolatilization was effected as in Example 1 except adding no foaming agent to the polymer solution to be introduced to the last-stage devolatizer. Table 3 shows the operating conditions of the last-stage devolatizer and the analytical results of the pellets obtained.

COMPARATIVE EXAMPLE 6

Devolatilization was effected as in Example 3 except adding 5% of the foaming agent to the polymer solution to be introduced to the last-stage devolatizer. Table 3 shows the operating conditions of the last-stage devolatizer and the analytical results of the pellets obtained.

COMPARATIVE EXAMPLE 7

Devolatilization was effected as in Example 1 except not providing the orifice 13 at the inlet of the heat transfer tube in the last-stage devolatizer. Table 3 shows the operating conditions of the last-stage devolatilzer and the analytical results of the pellets obtained.

TABLE 1

| Conditions for last-stage devolatilization | Example | | | |
|---|---|---|---|---|
| | 1 | 2 | 3 | 4 |
| Orifice (φ × L) mm | 3 × 30 | 3 × 30 | 3 × 30 | 3 × 30 |
| Solid content (wt %) | 99 | 98 | 99 | 99 |
| Pressure of polymer solution at inlet of heat transfer tube (kg/cm$^2$) | 35 | 32 | 44 | 35 |
| Temperature of polymer solution at inlet of heat transfer tube (° C.) | 230 | 230 | 215 | 230 |
| Temperature for heating heat transfer tube (° C.) | 250 | 250 | 250 | 270 |
| Vacuum (Torr) | 8 | 8 | 8 | 8 |
| Foaming agent added (wt %) | 2 | 3 | 3 | 3 |
| Amount of volatile matters (ppm) | 70 | 95 | 80 | 70 |
| Amount of low-molecular-weight substances (wt %) | 1.1 | 1.3 | 1.2 | 1.2 |

TABLE 2

| Conditions for last-stage devolatilization | Comparative example | | | |
|---|---|---|---|---|
| | 1 | 2 | 3 | 4 |
| Orifice (φ × L) mm | 3 × 30 | 3 × 30 | 3 × 30 | 3 × 30 |
| Solid content (wt %) | 95 | 99 | 99 | 99 |
| Pressure of polymer solution at inlet of heat transfer tube (kg/cm$^2$) | 35 | 65 | 15 | 35 |
| Temperature of polymer solution at inlet of heat transfer tube (° C.) | 205 | 180 | 270 | 230 |
| Temperature for heating heat transfer tube (° C.) | 250 | 250 | 250 | 250 |
| Vacuum (Torr) | 8 | 8 | 8 | 25 |
| Foaming agent added (wt %) | 2 | 2 | 2 | 2 |
| Amount of volatile matters (ppm) | 1000 | 350 | 300 | 400 |
| Amount of low-molecular-weight substances (wt %) | 2.2 | 1.7 | 1.8 | 1.7 |

TABLE 3

| Conditions for last-stage devolatilization | Comparative example | | |
|---|---|---|---|
| | 5 | 6 | 7 |
| Orifice (φ × L) mm | 3 × 30 | 3 × 30 | None |
| Solid content (wt %) | 99 | 99 | 99 |
| Pressure of polymer solution at inlet of heat transfer tube (kg/cm$^2$) | 35 | 35 | 4 |

TABLE 3-continued

| Conditions for last-stage devolatilization | Comparative example | | |
|---|---|---|---|
| | 5 | 6 | 7 |
| Temperature of polymer solution at inlet of heat transfer tube (° C.) | 230 | 200 | 230 |
| Temperature for heating heat transfer tube (° C.) | 250 | 250 | 250 |
| Vacuum (Torr) | 8 | 8 | 8 |
| Foaming agent added (wt %) | 0 | 5 | 2 |
| Amount of volatile matters (ppm) | 1400 | 250 | 300 |
| Amount of low-molecular-weight substances (wt %) | 1.6 | 1.4 | 1.4 |

Industrial Applicability

The method of this invention can reduce the content of residual volatile matters to a level of 100 ppm or less by multi-stage devolatilization with a specified procedure for the last-stage devolatilization. Hence, aromatic vinyl resins produced by the method of this invention can be used widely as materials for food packaging particularly suitable for foamed polystyrene trays and containers of drinking water.

What is claimed is:

1. In a method for removing unreacted monomers and other volatile matters from a polymer solution composition produced by continuous mass polymerization or continuous solution polymerization of an aromatic vinyl monomer alone or a mixture of an aromatic vinyl monomer and other monomers copolymerizable with said aromatic monomer in the presence or absence of rubbery polymers, a method for removing volatile matters from a polymer solution composition which comprises effecting removal of volatile matters in two stages with the use of two flash devolatizing vessels, adjusting the solid content of the polymer solution composition at the outlet of the devolatizer before the last-stage devolatizer to a level in excess of 97%, adding 0.5–4% by weight of a foaming agent to the total polymer solution composition during transfer of said composition from the outlet of the devolatizer before the last-stage devolatizer to the inlet of the last-stage devolatizer, passing said composition from the inlet of the last-stage devolatizer to a pressure controller while maintaining the pressure of said composition at 10 kg/cm$^2$ or more by means of the pressure controller provided in the last-stage devolatizer or at the inlet of the last-stage devolatizer and maintaining the temperature of said composition in the range 190–260° C., thereafter introducing the polymer solution composition to a vapor-liquid separation vessel kept at a vacuum of 20 Torr or less and allowing said composition to foam, wherein the last-stage devolatizer is composed of a heating device and a vapor-liquid separation vessel arranged in succession, the heating device is a vertical multitubular heat exchanger consisting of flow tubes for polymers and a heat transfer medium, heating is effected by the heating device at 210–280° C., and the amount of volatile matters in the polymer solution composition withdrawn from the outlet of the last-stage devolatizer is made 100 ppm by weight or less.

2. A method of removing volatile matter from a polymer solution composition as described in claim 1 wherein the pressure controller is a pressure controlling orifice.

3. A method of removing volatile matter from a polymer solution composition as described in claim 1 wherein a static mixer is equipped between two flash devolatizing vessels.

* * * * *